United States Patent
Klein et al.

(10) Patent No.: US 8,385,930 B2
(45) Date of Patent: Feb. 26, 2013

(54) REDUCED RESOURCE ALLOCATION PARAMETER SIGNALLING

(75) Inventors: Anja Klein, Darmstadt (DE); Christian Müller, Mendig (DE); Bernhard Raaf, Neuried (DE)

(73) Assignee: Nokia Siemens Networks Oy, Espoo (FI)

( * ) Notice: Subject to any disclaimer, the term of this patent is extended or adjusted under 35 U.S.C. 154(b) by 158 days.

(21) Appl. No.: 13/002,921

(22) PCT Filed: Jul. 9, 2009

(86) PCT No.: PCT/EP2009/058738
§ 371 (c)(1),
(2), (4) Date: Mar. 28, 2011

(87) PCT Pub. No.: WO2010/004000
PCT Pub. Date: Jan. 14, 2010

(65) Prior Publication Data
US 2011/0171965 A1    Jul. 14, 2011

(30) Foreign Application Priority Data
Jul. 9, 2008 (EP) ................... 08104680

(51) Int. Cl.
*H04Q 7/20* (2006.01)
(52) U.S. Cl. .......... 455/450; 455/452.1; 455/452.2; 370/329
(58) Field of Classification Search ........ 455/450, 455/452.1, 452.2; 370/329
See application file for complete search history.

(56) References Cited

U.S. PATENT DOCUMENTS

| | | | |
|---|---|---|---|
| 7,995,469 B2 * | 8/2011 | Steets et al. | 370/225 |
| 2002/0042275 A1 * | 4/2002 | Kitazawa et al. | 455/452 |

(Continued)

FOREIGN PATENT DOCUMENTS

| | | |
|---|---|---|
| EP | 1 303 162 A2 | 4/2003 |
| EP | 1 804 430 A1 | 7/2007 |

(Continued)

OTHER PUBLICATIONS

Lee, Ki-Dong, et al., "Fair Allocation of Subcarrier and Power in an OFDMA Wireless Mesh Network", Abstract only, IEEE, 24 Issue : 11, Nov. 2006, 1 page.

*Primary Examiner* — Danh Le
(74) *Attorney, Agent, or Firm* — Harrington & Smith

(57) ABSTRACT

It is described a method for distributing radio resources between a first radio link between a primary network element being assigned to a first hierarchic level of a network and a first secondary network element being assigned to a second hierarchic level and a second radio link between the primary network element and a second secondary network element being assigned to the second hierarchic level. The method includes (a) transmitting respectively a first resource allocation parameter from the first and the second secondary network element to a decision unit, the first resource allocation parameter being indicative for a minimum performance requirement, (b) transmitting respectively a second resource allocation parameter from the first and the second secondary network element to the decision unit, the second resource allocation parameter being indicative for a performance increase for the respective radio link following an allocation of additional radio resources, and (c) distributing the radio resources between the first and the second radio link based on the first and the second resource allocation parameter.

16 Claims, 1 Drawing Sheet

U.S. PATENT DOCUMENTS

| | | | |
|---|---|---|---|
| 2004/0136379 A1* | 7/2004 | Liao et al. | 370/395.21 |
| 2006/0159105 A1 | 7/2006 | Kleo | 370/395.21 |
| 2007/0109990 A1* | 5/2007 | Bennett | 370/328 |
| 2007/0110035 A1* | 5/2007 | Bennett | 370/352 |
| 2007/0110080 A1* | 5/2007 | Bennett | 370/400 |
| 2008/0090585 A1* | 4/2008 | Hart et al. | 455/453 |

FOREIGN PATENT DOCUMENTS

| | | |
|---|---|---|
| EP | 1 912 390 A1 | 4/2008 |
| WO | WO 99/09691 | 2/1999 |
| WO | WO 01/06710 A1 | 1/2001 |

\* cited by examiner

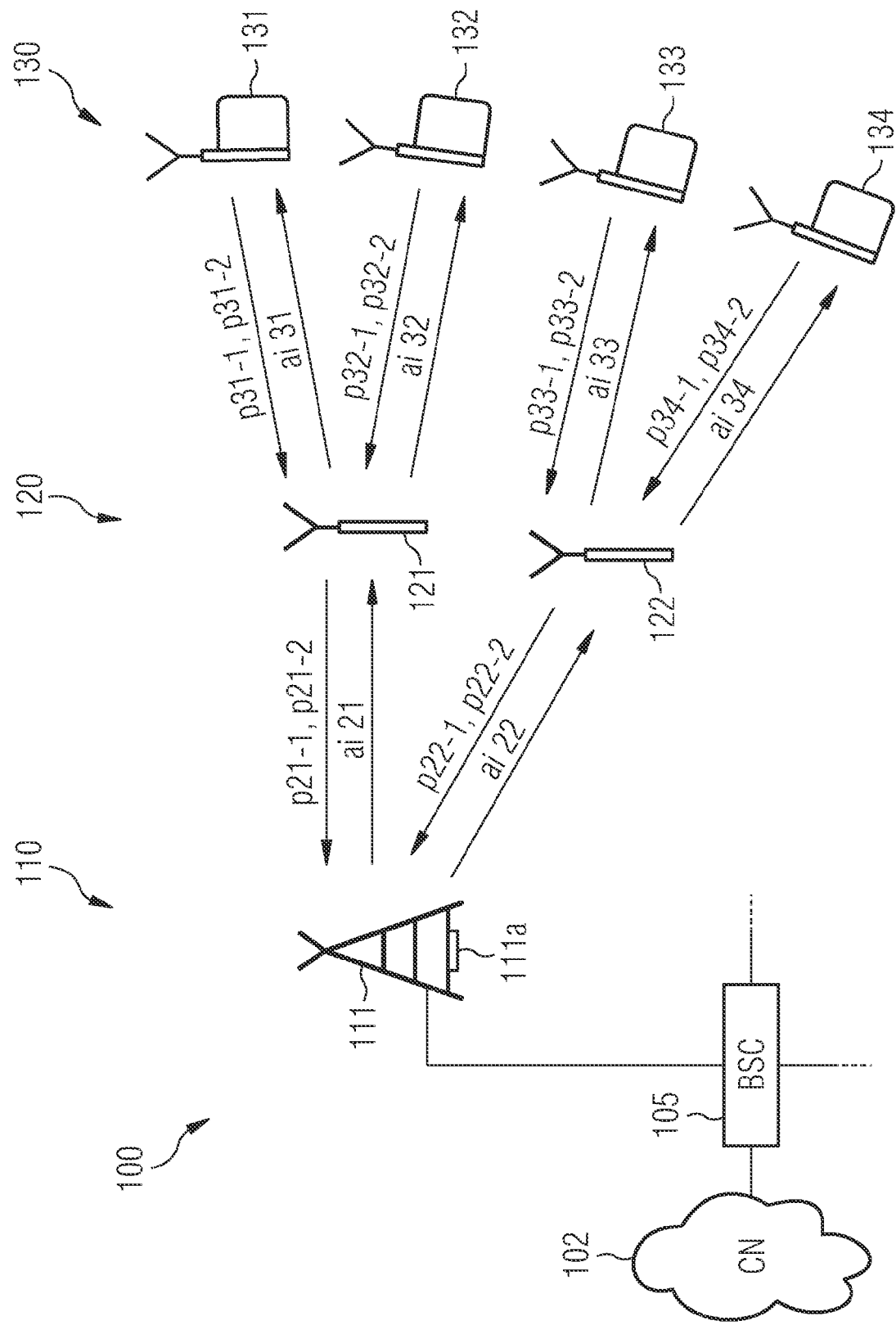

US 8,385,930 B2

REDUCED RESOURCE ALLOCATION PARAMETER SIGNALLING

FIELD OF INVENTION

The present invention relates to the field of mobile telecommunication networks. In particular, the present invention relates to a method and to a decision unit for distributing available radio resources between different radio links within a mobile telecommunication network. Further, the present invention relates to a computer program for controlling the network resource distribution method as described above.

ART BACKGROUND

In a known relay telecommunication network at least three classes of network elements exist: (a) Base station respectively access points, (b) relay nodes and (c) user terminals respectively used equipments. A base station is a fix station which is connected to a wired or wireless backhaul service. A user equipment is a station controlled by a human or autonomous machine, for instance a consumer electronic device or a PDA. A user equipment may communicate with base stations, relay nodes or other user equipments using a wireless link.

A relay station is a fixed or mobile device within a wireless telecommunication network which receives a signal transmitted by a source or another relay node and forwards the received information to a sink or another relay node. A relay node may be part of the infrastructure of a telecommunication network. Using relay nodes in a wireless telecommunication network increases the coverage of an access point to user equipments. Furthermore, deploying relay nodes and access points is a promising solution to build up high capacity mobile telecommunication networks.

A relay telecommunication network is divided into cells. A cell is a set of one base station, a number of relay nodes and user equipments, which are directly connected to the base station or connected via one or several relay nodes to the base station. In a cell of a relay network, several radio connections exist. A radio connection can be decomposed into radio links. For instance, a connection between a base station and a user equipment via a relay node can be decomposed into a first radio link between the base station and the relay node and a second radio link between the relay node and the user equipment.

For providing a high performance data transmission multiple access schemes such as orthogonal frequency division multiple access (OFDMA) are used. In an OFDMA system, chunks are defined by a number of subcarriers in the frequency domain and a number of orthogonal frequency division multiplex (OFDM) symbols in the time domain. Chunks in this respect denote a radio resource allocation in the frequency and in the time domain. By means of a resource allocation process (a) chunks are allocated to links, (b) power is allocated to chunks and (c) a modulation and coding scheme is chosen for a chunk. A resource allocation process must ensure that each connection fulfils its defined quality of service (QoS) constraints such as a minimum data rate and/or a maximum delay for the information propagation.

Known resource allocation processes take into account parameters like channel quality indicator representing the Channel State Information (CSI) about a link, priority information about a link and/or parameters describing the quality of a service transmitted over a link. Such parameters may be for instance a delay, a packet error probability or an average data rate achieved in the past. The parameters taken into account are called resource allocation parameters.

In a relay telecommunication network operating with OFDMA several radio connections are established within a single cell. For each radio connection, a set of Quality of Service (QoS) constraints exists. Since a radio connection can be decomposed into radio links, the QoS constraints of a radio link are defined by the QoS constraints of the corresponding radio connection.

A relay node may have partial or full knowledge of the QoS constraints of the radio links which are served by the relay node. A base station may have full knowledge of the QoS constraints of all the radio links which are served by the base station. If a random access is not preferred for instance due to the capacity loss inherent from collisions, the resource allocation process must be coordinated between the base station, the relay nodes and user equipments within a cell to ensure that the QoS constraints are fulfilled. Therefore the question arises which resource allocation parameters are reported to a unit being responsible for the radio resource allocation in order to properly coordinate the resource allocation process.

A brute force solution for radio resource allocation is that no resource allocation parameters are reported to the base station. The base station and the relay nodes are allocated predefined chunks. In the downlink direction a transmitter which is the base station or one of the relay nodes is allocated a fixed number of chunks. Each transmitter applies its own resource allocation process within its allocated chunks. Thereby, the resource allocation processes of different transmitters are not coordinated. In the uplink direction, a fixed number of chunks are allocated to the base station and to the relay nodes. The chunks are used for reception. This kind of static allocation has the advantage of a low signaling overhead since the resource allocation parameters are not forwarded by a relay node to the base station. The disadvantage is that chunks are used quite inefficiently since the resource allocation process cannot adapt the number of chunks to time varying channel states or time varying traffic load.

In the publication K. -D. Lee, V. C. M. Leung ("Fair Allocation of Subcarrier and Power in an OFDMA Wireless Mesh Network", IEEE Journal on selected areas in communication, Vol. 24, No. 11, November 2006) a radio resource allocation method is presented for a relay network using OFDMA. Based on CSI averaged over all chunks and given for all radio links and based on knowledge of the traffic of all network elements, a central unit such as for instance a base station or any access point allocates the number of chunks to all network elements of a relay network. Each station performs the power allocation to its chunks. Since a central unit requires the averaged CSI of all radio links and the knowledge of the traffic of all network elements, the signaling overhead is expected to be quite high.

There may be a need for improving the radio resource allocation process for a mobile telecommunication network, wherein on the one hand a proper radio resource distribution between different radio links is realized and on the other hand the data volume used for transmitting signaling information between different network elements is kept within acceptable limits.

SUMMARY OF THE INVENTION

This need may be met by the subject matter according to the independent claims. Advantageous embodiments of the present invention are described by the dependent claims.

According to a first aspect of the invention there is provided a Method for distributing available radio resources between at least a first radio link extending between a primary network element being assigned to a first hierarchic level of a telecommunication network and a first secondary network element being assigned to a second hierarchic level of the telecommunication network and a second radio link extending between the primary network element and a second secondary network element being assigned to the second hierarchic level of the telecommunication network. The provided method comprises (a) transmitting respectively a first resource allocation parameter from the first and the second secondary network element to a decision unit, wherein the first resource allocation parameter is indicative for a respective minimum performance requirement of the respective radio link, (b) transmitting respectively a second resource allocation parameter from the first and the second secondary network element to the decision unit, wherein the second resource allocation parameter is indicative for a performance increase for the respective radio link, which would result from an allocation of additional radio resources to the respective radio link, and (c) distributing the available radio resources by the decision unit between the first radio link and the second radio link based on the first resource allocation parameter and the second resource allocation parameter.

This aspect of the invention is based on the idea that a reduced resource allocation parameter signaling is sufficient in order to realize a proper radio resource distribution between the at least two radio links while keeping the amount of signaling data within acceptable limits. Thereby, the two secondary network elements may compete with each other with respect to the amount of radio resources being allocated to them.

By contrast to known methods for properly allocating network resources to different radio links the described resource allocation process works with a significantly reduced signaling overhead. Thereby, in total only two parameters and not a parameter for each chunk and for each link within a cell are transmitted from the competing secondary network elements to the decision unit.

The first resource allocation parameter may be called satisfying parameter. The satisfying parameter may describe how many chunks are required at least for the respective radio link in order to guarantee that all radio links, in which the respective secondary network element is involved, fulfill their minimum performance requirements. The minimum performance requirements may be for instance Quality of Service (QoS) constraints of the respective secondary network element.

The second resource allocation parameter may be called additive parameter. The additive parameter may be a metric describing what additional benefit a secondary network element will achieve if it is allocated more chunks than requested by the first resource allocation parameter respectively by the satisfying parameter.

It has to be mentioned that the described radio resource distributing method can be used for uplink data transmissions and/or for downlink data transmissions. In an uplink data transmission data are transmitted from network elements of the second hierarchical level to network elements of the first hierarchical level. In a downlink data transmission data are transmitted from network elements of the first hierarchical level to network elements of the second hierarchical level.

According to an embodiment of the invention the first resource allocation parameter and/or the second resource allocation parameter is determined by the respective secondary network element based on current resource allocation parameters or radio propagation parameters. This may provide the advantage that the respective secondary network element can exploit evaluations about current resource allocations in order to obtain a second resource allocation parameter with only little computational expenses. Thereby, the radio propagation parameters may be indicative for the quality of the radio transmission link between different network elements.

According to a further embodiment of the invention the first resource allocation parameter and the second resource allocation parameter are transmitted to the primary network element periodically or triggered by an event.

The described reporting of the first resource allocation parameter (satisfying parameter) and the second resource allocation parameter (additive parameter) to the primary network element may provide the advantage that the distribution of available network resources may be optimized by means of an updating procedure. Such an update can be regularly carried out after respectively a predefined time span. However, the update can also be initiated by a network event such as for instance a logging in or a logging out of user equipments being connected directly or indirectly to the primary network element and/or to one of the secondary network elements. Further, an update can be carried out if it is expected that a user terminal is starting or terminating a service which involves a high throughput of user data. Of course, the point in time when the first and the second resource allocation parameter are reported can be optimized individually for each type of network.

According to a further embodiment of the invention the decision unit is assigned (a) to a network controller, (b) to a base station and/or (c) to a relay station of the telecommunication network. Generally speaking, the described decision unit can be implemented within any network station of the telecommunication network, which is at least partially a mobile telecommunication network. Preferably, with respect to the hierarchic level of the described secondary network elements the decision unit is implemented in a network station, which is assigned to a higher hierarchic level.

According to a further embodiment of the invention (a) the primary network element is a relay node, (b) the first secondary network element is a first user equipment and (c) the second secondary network element is a second user equipment.

The user equipment may be any type of communication end device, which is capable of connecting with an arbitrary access point such as a relay node by means of a wireless transmission link. In particular the user equipment may be a cellular mobile phone, a Personal Digital Assistant (PDA), a notebook computer and/or any other movable communication device.

In this respect it is mentioned that of course the first and/or the second user equipment can also be connected to the described relay node via one or more further relay nodes. Thereby, a multi-hop connection may be established.

According to a further embodiment of the invention the method is carried out within a telecommunication network, which further comprises tertiary network elements being assigned to a third hierarchical level. The method further comprises (a) generating respectively a first subordinate resource allocation parameter being indicative for a respective subordinate minimum performance requirement of a radio link between the respective tertiary network element and the first secondary network element, (b) generating respectively a second subordinate resource allocation parameter being indicative for a respective subordinate performance increase for the radio link between the respective tertiary network element and the first secondary network element, which performance increase would result from an allocation of additional radio resources to the respective radio link, and (c) determining, based on each of the first subordinate resource allocation parameter and each of the second subordinate resource allocation parameter, the first resource allocation parameter and the second resource allocation parameter being assigned to the first secondary network element.

The generation of the respective first subordinate resource allocation parameter and/or the respective second subordinate resource allocation parameter can be carried out in different network elements of the telecommunication network. For instance these subordinate resource allocation parameters can be generated in the second secondary network element based on reporting information of the tertiary network elements. Thereby, a tertiary network element can be a user equipment and the secondary network element can be a relay node serving the user equipment.

Further, the generation of the respective first subordinate resource allocation parameter and/or the respective second subordinate resource allocation parameter can be carried out in the respective tertiary network element. In this case these resource allocation parameters have to be transmitted to the secondary network element. As a consequence the described reduced resource allocation parameter signaling method comprises (a) transmitting respectively a first subordinate resource allocation parameter from each of the tertiary network elements being connected to the first secondary network element to the first secondary network element, wherein each first subordinate resource allocation parameter is indicative for a respective subordinate minimum performance requirement of a radio link between the respective tertiary network element and the first secondary network element, (b) transmitting respectively a second subordinate resource allocation parameter from each of the tertiary network elements being connected to the first secondary network element to the first secondary network element, wherein the second subordinate resource allocation parameter is indicative for a respective subordinate performance increase for the radio link between the respective tertiary network element and the first secondary network element, which performance increase would result from an allocation of additional radio resources to the respective radio link, and (c) determining, based on each of the first subordinate resource allocation parameter and each of the second subordinate resource allocation parameter, the first resource allocation parameter and the second resource allocation parameter being assigned to the first secondary network element.

The described three-stage reduced resource allocation parameter signaling method, which involves network elements being assigned to three different hierarchical levels, may provide the advantage that the resource request of each tertiary network element can be taken into account by the decision unit. Thereby, it is not necessary however not forbidden to forward all first and second subordinate resource allocation parameters to the decision unit. The respective first subordinate resource allocation parameters are rather combined by the first secondary network element into the first resource allocation parameter. Accordingly, the respective second subordinate resource allocation parameters are rather combined by the first secondary network element into the second resource allocation parameter.

At this point it is emphasized that the described three-stage method for distributing available radio resources can also be carried out if only one tertiary network element is connected to the first secondary network element. If this is the case the first resource allocation parameter corresponds to the first subordinate resource allocation parameter and the second resource allocation parameter corresponds to the second subordinate resource allocation parameter.

However, compared to known resource allocation procedures the described method provides the most benefit if a high number of tertiary network elements are connected to the first secondary network element and a plurality of first and second subordinate resource allocation parameters is compressed into the one and only first resource allocation parameter and the one and only second resource allocation parameter, respectively. Descriptively speaking, the first secondary network element has all information about the status, the necessary requirements and/or the optional requirements with respect to the radio links being arranged downstream of the first secondary network element. However, not all this information but only a condensate of this information is forwarded to the primary network element.

Preferably, the determination of the first resource allocation parameter and the second resource allocation parameter is carried out by the first secondary network element. Thereby, the signaling overhead can be kept within acceptable limits.

It has to be mentioned that it is also possible that the first secondary network element simply forwards the first and second subordinate resource allocation parameters to primary network element. In this case there is no compression of signaling data at the first secondary network element. It is further mentioned that also any intermediate solution between a simple forwarding of the first and second subordinate resource allocation parameters and a strong data compression into only one first and one second resource allocation parameter should be possible.

According to a further embodiment of the invention the method further comprises (a) transmitting respectively a first subordinate resource allocation parameter from each of the tertiary network elements being connected to the second secondary network element to the second secondary network element, wherein each first subordinate resource allocation parameter is indicative for a respective subordinate minimum performance requirement of a radio link between the respective tertiary network element and the second secondary network element, (b) transmitting respectively a second subordinate resource allocation parameter from each of the tertiary network elements being connected to the second secondary network element to the second secondary network element, wherein the second subordinate resource allocation parameter is indicative for a respective subordinate performance increase for the radio link between the respective tertiary network element and the second secondary network element, which performance increase would result from an allocation of additional radio resources to the respective radio link, and (c) determining, based on each of the first subordinate resource allocation parameter and each of the second subordinate resource allocation parameter, the first resource allocation parameter and the second resource allocation parameter being assigned to the second secondary network element.

This may provide the advantage that each secondary network element may collect the first and second subordinate resource allocation parameters from the tertiary network elements being connected to the respective secondary network element. The information about these parameters, which are acquired by each secondary network element, is then compressed and the compressed information is transmitted from each secondary network element to the primary network element.

Thereby, basically the first resource allocation parameter respectively the satisfying parameter tells which and/or how many resources or chunks have to be allocated to the respective secondary network element in order to allow it to fulfill the performance requirements for its subordinate tertiary network elements. In a first step the primary network element will have to allocate resources accordingly to each secondary network element in order to guarantee (if possible) an overall minimum performance. The second resource allocation parameter respectively the additive parameter tells how much better a secondary network element can serve its tertiary network elements, if more radio resources would be allocated to this secondary network element. If additional resources are available after this first step, the primary network element can use this information to optimally distribute these remaining resources on the different secondary network elements.

Depending on the metric to optimize the resource distribution such as cell throughput, minimum user throughput, etc., both the precise meaning of the first resource allocation (satisfying) parameter and the second resource allocation (additive) parameter and also the algorithm for allocating resources in the first and second step will need to be adapted accordingly.

According to a further embodiment of the invention (a) the primary network element is a base station, (b) the first secondary network element is a first relay node and (c) the second secondary network element is a second relay node. This may provide the advantage that the described radio resource distribution method can be carried out within mobile telecommunication networks comprising relay nodes, which at present are seen as promising elements in order to increase the coverage of cellular mobile telecommunication networks, and which due to reduced site costs are expected to provide an economically viable solution for increasing the performance of for instance Long Term Evolution telecommunication networks.

According to a further embodiment of the invention the decision unit is realized in a central unit which is adapted for collecting the first and the second resource allocation parameter and/or the first and the second subordinate resource allocation parameter and provides a control of the resource allocation process within a cell of a cellular telecommunication network.

In other words, in particular in OFDM the decision unit reports the chunks to be allocated to the secondary network elements. Thereby, the available chunks are partitioned between the secondary network elements. The secondary network elements themselves may allocate chunks to its served radio links connecting tertiary network elements to the respective secondary network element. Further, the respective secondary network element may allocate a suitable radio power to each chunk and/or may choose an appropriate modulation and coding scheme for transmitting user data.

According to a further embodiment of the invention the second resource allocation parameter and/or the second subordinate resource allocation parameter comprises a ratio of two data rates. This may provide the advantage that the second resource allocation parameter and/or the second subordinate resource allocation parameter can be determined by means of a very easy rule. Thereby, a simple proportional fair resource allocation process can be established. The data rate of the nominator of the ratio may be the data rate which will be able to be achieved by the corresponding network element in the future. The data rate of the denominator of the ratio may be the data rate which was achieved by the corresponding network element in the past.

According to a further embodiment of the invention the second resource allocation parameter and/or the second subordinate resource allocation parameter comprises a priority factor representing the number of allocated chunks in the past. This may provide the advantage that a temporal unstable resource allocation can be avoided, wherein the resource allocation to a certain radio link frequently changes over time. Therefore, the described priority value being used for the second resource allocation parameter and/or for the second subordinate resource allocation parameter may allow for a substantial equal distribution of radio resources over time. In particular in OFDM chunks may allocated substantially equally over time to the corresponding radio link.

According to a further embodiment of the invention the second resource allocation parameter and/or the second subordinate resource allocation parameter comprises at least on of a number of bits per chunk, a signal-to-noise ratio, a signal-to-interference ratio, a signal-to-interference-plus-noise ratio, a priority value, a bit error rate, a packet error rate, a delay value, a value describing a buffer state, a symbol error rate, a noise power, and an interference power.

In this respect the term "chunk" refers to a radio transmission resource. For instance in Orthogonal Frequency Division Multiplexing (OFDM) the dimension of a chunk is defined by the number of subcarriers on the one hand and by a time slot being assigned to the subcarriers. In particular, a plurality of neighboring subcarriers is used for dimensioning a "chunk".

The priority value may be indicative for instance for a priority of a given network element with respect to other network elements of the same hierarchic level. The priority value may be given by an operator of the telecommunication network. Thereby, different remuneration of contracts between end users and the operator may be taken into account. This may mean that the user equipments of premium end users, which have a monetarily higher contract with the operator, are prioritized by allocating higher radio resources to radio links, which is assigned to a tree of a tree structure representing the hierarchic telecommunication network where also the user terminals of the premium end users are assigned to.

The priority value may also be indicative for instance for a priority of a service that is provided to or via a given network element. Then there may be different services which may be conveyed via different bearers to the network elements. Different services may be charged differently, and operators may decide to prioritize high value respectively high cost services.

According to a further embodiment of the invention the second resource allocation parameter and/or the second subordinate resource allocation parameter are adapted to a scheduling metric. Thereby, the second resource allocation parameter and/or the second subordinate resource allocation parameter can be adapted by using the increment in total, i.e. cell wide scheduling metric, which is achieved if an additional chunk is allocated to the respective network element.

According to a further aspect of the invention there is provided a decision unit for distributing available radio resources between at least a first radio link extending between a primary network element being assigned to a first hierarchic level of a telecommunication network and a first secondary network element being assigned to a second hierarchic level of the telecommunication network and a second radio link extending between the primary network element and a second secondary network element being assigned to the second hierarchic level of the telecommunication network. The described decision unit comprises (a) a first receiving unit for receiving respectively a first resource allocation parameter from the first and the second secondary network element, wherein the first resource allocation parameter is indicative for a respective minimum performance requirement of the respective radio link, (b) a second receiving unit for receiving respectively a second resource allocation parameter from the first and the second secondary network element, wherein the second resource allocation parameter is indicative for a performance increase for the respective radio link, which would result from an allocation of additional radio resources to the respective radio link, and (c) a data processor for distributing the available radio resources between the first radio link and the second radio link based on the first resource allocation parameter and the second resource allocation parameter.

This aspect of the invention is based on the idea that the described decision unit can be used for an effective reduced resource allocation parameter signaling in order to realize a proper radio resource distribution between the at least two radio links while keeping the amount of signaling data within acceptable limits. The at least two secondary network elements, which of course have to be connected directly or indirectly to the decision unit, may compete with each other with respect to the amount of radio resources being allocated to them.

The decision unit may be implemented within and/or assigned to any network element of the telecommunication network, which is at least partially a mobile telecommunication network. In particular, the decision unit may be implemented in a network controller, a base station and/or in a relay station of the telecommunication network. Preferably, with respect to the hierarchic level of the described secondary network elements, the decision unit is implemented in a network station, which is assigned to a higher hierarchic level. Thereby, it is further preferable that the decision unit is located close to the receiver of the control signals provided by the decision unit.

According to a further aspect of the invention there is provided a first secondary network element for distributing available radio resources between at least a first radio link extending between a primary network element being assigned to a first hierarchic level of a telecommunication network and the first secondary network element being assigned to a second hierarchic level of the telecommunication network and a second radio link extending between the primary network element and a second secondary network element being assigned to the second hierarchic level of the telecommunication network. The first secondary network element comprises (a) a calculating unit for calculating respectively a first resource allocation parameter being indicative for a respective minimum performance requirement of the respective radio link and for calculating respectively a second resource allocation parameter being indicative for a performance increase for the respective radio link, which would result from an allocation of additional radio resources to the respective radio link, (b) a transmitting unit for transmitting the first resource allocation parameter and the second resource allocation parameter to a decision unit, (c) a receiving unit for receiving resource allocation instructions from the decision unit, and (d) an executing unit for distributing the available radio resources between the first radio link and the second radio link based on the received resource allocation instructions.

According to a further aspect of the invention there is provided a computer program for distributing available radio resources between at least a first radio link extending between a primary network element being assigned to a first hierarchic level of a telecommunication network and a first secondary network element being assigned to a second hierarchic level of the telecommunication network and a second radio link extending between the primary network element and a second secondary network element being assigned to the second hierarchic level of the telecommunication network. The computer program, when being executed by a data processor, is adapted for controlling the above described radio resource distributing method.

As used herein, reference to a computer program is intended to be equivalent to a reference to a program element and/or a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program may be available from a network, such as the WorldWideWeb, from which it may be downloaded.

Embodiments of the described invention may be realized by means of a computer program respectively software. However, embodiments of the invention may also be realized by means of one or more specific electronic circuits respectively hardware. Furthermore, the embodiments may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the example of embodiment to be described hereinafter and are explained with reference to the example of embodiment. The invention will be described in more detail hereinafter with reference to the example of embodiment but to which the invention is not limited.

BRIEF DESCRIPTION OF THE DRAWINGS

The only FIGURE shows a telecommunication network comprising a base station, two relay nodes being connected to the base station and four user equipments respectively being connected to one of the relay nodes, wherein each relay node (a) collects two signaling parameters from each of its user equipments, (b) evaluates a set of two signaling parameters based on the collected signaling parameters and (c) transmits the condensed set of two signaling parameters to the base station, which based on the condensed set allocates radio resources to the different radio links.

DETAILED DESCRIPTION

The illustration in the drawing is schematically.

The accompanying FIGURE shows a cellular telecommunication network 100, which comprises a base station controller 105 and a plurality of base stations, which are connected to the base station controller (BSC) 105 by means of a connection, which may be wired, optical or wireless e.g. using microwave links. For the sake of clarity only one base station 111 is depicted in the FIGURE. The base station controller 105 is connected to a core network 102. Instead of being connected to a BSC, the base stations may also be connected to an access gateway or another network element providing connectivity to a core network or internet. According to the embodiment described here the core network 102 is an IP based network connecting the base station controller 105 to other non depicted base station controllers.

The base station 111 is assigned to a cell of the cellular telecommunication network 100. In order to increase the performance and/or the spatial extension of the cell relay nodes 121 and 122 are provided, which are connected to the base station 111 in a wireless manner. According to the embodiment described here the network 100 further comprises four user equipments 131, 132, 133 and 134, which are connected respectively to one of the relay nodes 121 or 122.

As can be seen from the FIGURE, all network elements being assigned to the depicted cell of the telecommunication network 100 are functionally arranged at different nodes of a tree, which comprises a hierarchical structure. Specifically, the base station 111, which represent a primary network element, is assigned to a first hierarchical level 110. The relay nodes 121 and 121, which represent respectively a secondary network element, are assigned to a second hierarchical level 120. The user equipments 131, 132, 133 and 134, which represent respectively a tertiary network element, are assigned to a third hierarchical level 120.

With respect to the radio resources being assigned to the base station 110, the two relay nodes 121 and 122 compete with each other for respectively a maximum radio resource allocation. The more radio resources are provided for instance to the relay node 121, the more radio resources can be exploited by the user equipments 131 and 132, which are served by the relay node 121. Accordingly, the two user equipments 131 and 132 compete with each other for getting allocated respectively a maximum of radio resources, which have been assigned to the relay node 121. The same holds for the two user equipments 133 and 134, which are served by the relay node 122.

In the following a preferred method for appropriately distributing available radio resources between different radio links of the depicted telecommunication network is described.

In a first step each user equipment reports to its serving relay node two parameters. A first parameter is a first subordinate resource allocation parameter, which in the following is also called a subordinate satisfying parameter. The subordinate satisfying parameter is indicative for a respective minimum performance requirement such as for instance a minimum data rate and/or a maximum delay for the corresponding propagation of information. A second parameter is a second subordinate resource allocation parameter, which in the following is also called a subordinate additive parameter. The subordinate additive parameter is indicative for a performance increase for the respective radio link, which would result from an allocation of additional radio resources to the respective radio link.

As can be seen from the FIGURE, the user equipment 131 reports a first subordinate resource allocation parameter p31-1 and a second subordinate resource allocation parameter p31-2 to the relay node 121. Accordingly, the user equipment 132 reports a first subordinate resource allocation parameter p32-1 and a second subordinate resource allocation parameter p32-2 to the relay node 121. Of course, if the relay node 121 would serve more than the two user equipments 131 and 132, more corresponding parameters would be reported to the relay node 121.

In a second step the relay node 121 determines a first resource allocation parameter p21-1 based on the parameters p31-1 and p32-1. The first resource allocation parameter p21-1 is also called satisfying parameter. Based on the parameters p31-2 and p32-2 the relay node 121 determines a second resource allocation parameter p21-2. The second resource allocation parameter p21-2 is also called additive parameter.

In a third step the relay node 121 reports the first resource allocation parameter p21-1 and the second resource allocation parameter p21-2 to the base station 111. The base station 111 receives also a first resource allocation parameter p22-1 and a second resource allocation parameter p22-2 from the relay node 122, which has determined these parameters in the same way based on a first subordinate resource allocation parameter p33-1 and a second subordinate resource allocation parameter p33-2 from the user equipment 133 and on a first subordinate resource allocation parameter p34-1 and a second subordinate resource allocation parameter p34-2 from the user equipment 134.

According to the embodiment described here the base station 111 comprises a decision unit 111a, which in a fourth step allocates radio resources to a first radio link extending between the base station 111 and the relay node 121 and to a second radio link extending between the base station 111 and the relay node 122. This allocation respectively distribution of radio resources is based on the first resource allocation parameters p21-1 and p22-1 and on the second resource allocation parameters p21-2 and p22-2.

In a fifth step the corresponding allocation information ai21 and ai22 are transmitted to the relay node 121 and to the relay node 122, respectively.

It has to be mentioned that the decision unit could also be implemented in other network elements of the telecommunication network such as for instance in the base station controller 105 or in any of the relay nodes 121 or 122.

In a sixth step the radio resources, which are allocated to the different relay nodes 121 and 122, are respectively distributed between the radio links connecting the respective relay node 121 or 122 with the user equipments 131, 132 and 133, 134, respectively. Thereby, the distribution, which is carried out by the relay node 121 is based (a) on the first subordinate resource allocation parameter p31-1 and the second subordinate resource allocation parameter p31-2 reported before by the user equipment 131 and (b) on the first subordinate resource allocation parameter p32-1 and the second subordinate resource allocation parameter p32-2 reported before by the user equipment 132. The distribution, which is carried out by the relay node 122 is based (a) on the first subordinate resource allocation parameter p33-1 and the second subordinate resource allocation parameter p33-2 reported before by the user equipment 133 and (b) on the first subordinate resource allocation parameter p34-1 and the second subordinate resource allocation parameter p34-2 reported before by the user equipment 134.

In the described resource allocation protocol the satisfying parameter p21-1, p22-1 is a value of a minimum number of chunks requested by the relay node 121, 122. The additive parameter p21-2, p22-2 is the highest average signal-to-noise ratio of a link between a relay node 121, 122 and a served user equipment 131, 132, 133, 134. In this example, the total number of transmitted parameters from the relay nodes 121, 122 to the base station 111 is four.

If the QoS constraints do not change within the cell and a buffer of the relay node 121, 122 does not become empty or overloaded, these two parameters per relay station are sufficient for allocating adaptively chunks to the relay stations 122 and 122.

The aim of the described resource allocation process may be the maximization of the sum of the downlink data rate within the cell being assigned to the base station 111. Thus, the additive parameter p21-2, p22-2 is preferably chosen as an average signal-to-noise ratio. However, other aims of a resource allocation process can also be realized with the described radio resource distribution method. Such aims may be achieved for instance (a) by using a ratio of two data rates as the additive parameter p21-2, p22-2 and/or (b) by using a priority factor representing the number of allocated chunks in the past as the additive parameter p21-2, p22-2. Since these types of additive parameter p21-2, p22-2 have already been described above, they will not again be explained in detail.

Since in the described resource allocation protocol only two parameters are reported by each relay node 121, 122, the described use of reduced resource allocation parameters signaling strongly decreases the signaling overhead in the relay telecommunication network 100 compared to a signaling which simply forwards parameters of each link or/and of each chunk to a central decision unit.

It has to be noted that in the described method it is not possible to optimize which particular chunk is allocated to which relay node 121, 122, only the number of chunks which have to be assigned can be determined. However, the determination of the number of chunks to be allocated is sufficient in order to provide for an adaptive radio resource allocation without having a large signaling overhead. If there are enough terminals assigned to each relay node 121, 122 so they can exploit multi user diversity, then this partial determination is sufficient for achieving a good operation because it is typically not important which particular chunks are assigned to a certain relay node 121, 122.

Despite the low signaling overhead, the use of the satisfying parameters p21-1, p22-1 and the additive parameters p21-2, p22-2 has the advantage that an adaptive resource allocation protocol can be enabled. As a consequence a much higher sum rate in a cell compared to a static resource allocation protocol can be achieved. A higher sum rate leads to more served user equipments in a cell or leads to a more reliable supply of user equipments.

It is mentioned that the described method for distributing radio resources to different radio links can also be carried out within hierarchical structured telecommunication networks comprising more than three levels. With respect to the maximum number of levels there is no principal upper limit.

It is further mentioned that the above described method can also be carried out in connection with an asymmetrical tree structure. Such an asymmetrical structure can be for instance realized if at least one user equipment is directly connected to the base station 111 and some other user equipments are indirectly connected to the base station 111 via one ore more relay nodes. It is also possible that different user equipments are indirectly connected to the base station via a different number series connected relay nodes.

It should be noted that the term "comprising" does not exclude other elements or steps and "a" or "an" does not exclude a plurality. It should also be noted that reference signs in the claims should not be construed as limiting the scope of the claims.

LIST OF REFERENCE SIGNS

100 telecommunication network
102 core network
105 network controller/base station controller
110 first hierarchical level
111 primary network element/base station
120 second hierarchical level
121 secondary network element/relay node
122 secondary network element/relay node
130 third hierarchical level
131 user equipment
132 user equipment
133 user equipment
134 user equipment
pxx-1 first resource allocation parameter/satisfying parameter (from network element 1xx)
pxx-2 second resource allocation parameter/additive parameter (from network element 1xx)
aixx allocation information to network element 1xx

The invention claimed is:

1. Method for distributing available radio resources between at least
   a first radio link extending between a primary network element being assigned to a first hierarchic level of a telecommunication network and a first secondary network element being assigned to a second hierarchic level of the telecommunication network and
   a second radio link extending between the primary network element and a second secondary network element being assigned to the second hierarchic level of the telecommunication network, the method comprising
   transmitting respectively a first resource allocation parameter from the first and the second secondary network element to a decision unit, wherein the first resource allocation parameter is indicative for a respective minimum performance requirement of the respective radio link,
   transmitting respectively a second resource allocation parameter from the first and the second secondary network element to the decision unit, wherein the second resource allocation parameter is indicative for a performance increase for the respective radio link, which would result from an allocation of additional radio resources to the respective radio link, and
   distributing the available radio resources by the decision unit between the first radio link and the second radio link based on the first resource allocation parameter and the second resource allocation parameter.

2. The method as set forth in claim 1, wherein the first resource allocation parameter and/or the second resource allocation parameter is determined by the respective secondary network element based on current resource allocation parameters or radio propagation parameters.

3. The method as set forth in claim 1, wherein the first resource allocation parameter and the second resource allocation parameter are transmitted to the primary network element periodically or triggered by an event.

4. The method as set forth in claim 1, wherein the decision unit is assigned to a network controller, to a base station and/or to a relay station of the telecommunication network.

5. The method as set forth in claim 1, wherein the primary network element is a relay node, the first secondary network element is a first user equipment and the second secondary network element is a second user equipment.

6. The method as set forth in claim 1, wherein the telecommunication network further comprises tertiary network elements being assigned to a third hierarchical level of the telecommunication network, the method further comprising
   generating respectively a first subordinate resource allocation parameter being indicative for a respective subordinate minimum performance requirement of a radio link between the respective tertiary network element and the first secondary network element,
   generating respectively a second subordinate resource allocation parameter being indicative for a respective subordinate performance increase for the radio link between the respective tertiary network element and the first secondary network element, which performance increase would result from an allocation of additional radio resources to the respective radio link, and determining, based on each of the first subordinate resource allocation parameter and each of the second subordinate resource allocation parameter, the first resource allocation parameter and the second resource allocation parameter being assigned to the first secondary network element.

7. The method as set forth in claim 6, further comprising transmitting respectively a first subordinate resource allocation parameter from each of the tertiary network elements being connected to the second secondary network element to the second secondary network element, wherein each first subordinate resource allocation parameter is indicative for a respective subordinate minimum performance requirement of a radio link between the respective tertiary network element and the second secondary network element, transmitting respectively a second subordinate resource allocation parameter from each of the tertiary network elements being connected to the second secondary network element to the second secondary network element, wherein the second subordinate resource allocation parameter is indicative for a respective subordinate performance increase for the radio link between the respective tertiary network element and the second secondary network element, which performance increase would result from an allocation of additional radio resources to the respective radio link, and determining, based on each of the first subordinate resource allocation parameter and each of the second subordinate resource allocation parameter, the first resource allocation parameter and the second resource allocation parameter being assigned to the second secondary network element.

8. The method as set forth in claim 7, wherein the primary network element is a base station, the first secondary network element is a first relay node and the second secondary network element is a second relay node.

9. The method as set forth in claim 1, wherein the decision unit is realized in a central unit which collects the first and the second resource allocation parameter and/or the first and the second subordinate resource allocation parameter and provides a control of the resource allocation process within in a cell of a cellular telecommunication network.

10. The method as set forth in claim 1, wherein the second resource allocation parameter and/or the second subordinate resource allocation parameter comprises a ratio of two data rates.

11. The method as set forth in claim 1, wherein the second resource allocation parameter and/or the second subordinate resource allocation parameter comprises a priority factor representing the number of allocated chunks in the past.

12. The method as set forth in claim 1, wherein the second resource allocation parameter and/or the second subordinate resource allocation parameter comprises at least one of
a number of bits per chunk,
a signal-to-noise ratio,
a signal-to-interference ratio,
a signal-to-interference-plus-noise ratio,
a priority value,
a bit error rate,
a packet error rate,
a delay value,
a value describing a buffer state,
a symbol error rate,
a noise power, and
an interference power.

13. The method as set forth in claim 1, wherein the second resource allocation parameter and/or the second subordinate resource allocation parameter is adapted to a scheduling metric.

14. A decision unit for distributing available radio resources between at least
a first radio link extending between a primary network element being assigned to a first hierarchic level of a telecommunication network and a first secondary network element being assigned to a second hierarchic level of the telecommunication network and
a second radio link extending between the primary network element and a second secondary network element being assigned to the second hierarchic level of the telecommunication network, the decision unit comprising
a first receiving unit for receiving respectively a first resource allocation parameter from the first and the second secondary network element, wherein the first resource allocation parameter is indicative for a respective minimum performance requirement of the respective radio link,
a second receiving unit for receiving respectively a second resource allocation parameter from the first and the second secondary network element, wherein the second resource allocation parameter is indicative for a performance increase for the respective radio link, which would result from an allocation of additional radio resources to the respective radio link, and
a data processor for distributing the available radio resources between the first radio link and the second radio link based on the first resource allocation parameter and the second resource allocation parameter.

15. A first secondary network element for distributing available radio resources between at least
a first radio link extending between a primary network element being assigned to a first hierarchic level of a telecommunication network and the first secondary network element being assigned to a second hierarchic level of the telecommunication network and
a second radio link extending between the primary network element and a second secondary network element being assigned to the second hierarchic level of the telecommunication network, the first secondary network element comprising
a calculating unit
for calculating respectively a first resource allocation parameter being indicative for a respective minimum performance requirement of the respective radio link and
for calculating respectively a second resource allocation parameter being indicative for a performance increase for the respective radio link, which would result from an allocation of additional radio resources to the respective radio link,
a transmitting unit for transmitting the first resource allocation parameter and the second resource allocation parameter to a decision unit,
a receiving unit for receiving resource allocation instructions from the decision unit, and an executing unit for distributing the available radio resources between the first radio link and the second radio link based on the received resource allocation instructions.

16. A computer program for distributing available radio resources between at least a first radio link extending between a primary network element being assigned to a first hierarchic level of a telecommunication network and a first secondary network element being assigned to a second hierarchic level of the telecommunication network and a second radio link extending between the primary network element and a second secondary network element being assigned to the second hierarchic level of the telecommunication network, the computer program, when being executed by a data processor, is adapted for controlling the method as set forth in claim 1.

\* \* \* \* \*